Feb. 6, 1923.
E. JOHANSSON
METHOD OF MAKING CROSS VENEERED WOODEN PLATES
Filed June 6, 1921
1,444,611
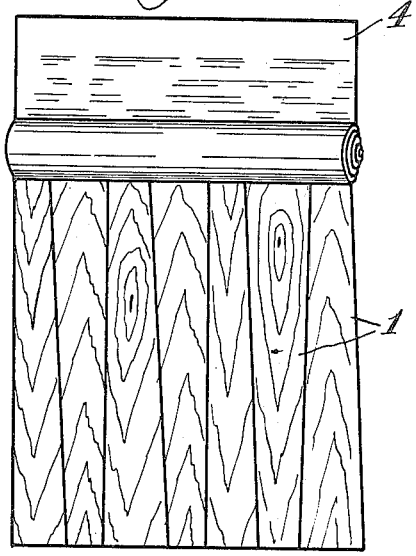
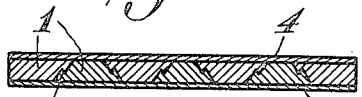
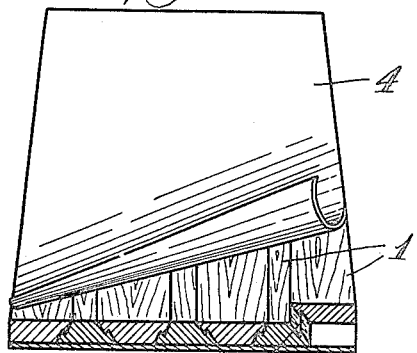
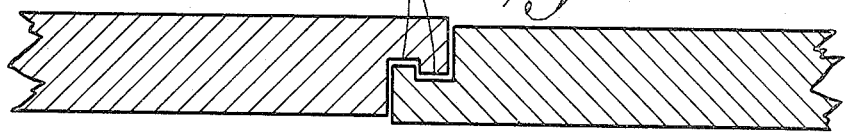
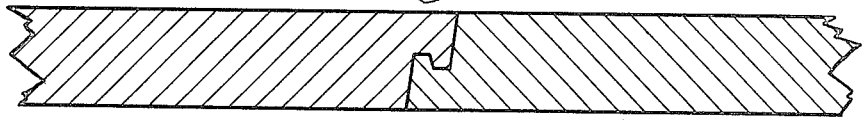
Inventor:
ERIK JOHANSSON
By George Bayard Jones atty.

Patented Feb. 6, 1923.

1,444,611

UNITED STATES PATENT OFFICE.

ERIK JOHANSSON, OF EDSBYN, SWEDEN.

METHOD OF MAKING CROSS-VENEERED WOODEN PLATES.

Application filed June 6, 1921. Serial No. 475,277.

*To all whom it may concern:*

Be it known that I, ERIK JOHANSSON, a subject of the King of Sweden, residing at Edsbyn, in the Kingdom of Sweden, have invented a new and useful Improvement in Methods of Making Cross-Veneered Wooden Plates, of which the following is a specification.

The present invention relates to a method of making so called cross-veneered wooden plates, that is to say plates in which veneer is attached to one side or to both sides of a plate made of assembled boards in such manner that the fibres of the veneer cross the fibres of the boards. The manufacture of such veneered plates has hitherto as a rule been carried on exclusively in direct connection with the manufacture of furniture and in such manner that boards have first been glued together to form a disk or plate of the desired size. After the plate thus produced has been planed or otherwise trimmed the veneer is attached and glued to one side or to both sides of the plate.

The purpose of the method forming the subject of the present invention is to render possible the manufacture of such plates in an essentially simpler and less expensive manner. The present method is broadly characterized by this that the edges of the boards are formed in such manner that they are capable of catching one in the other whereupon the gluing together of the boards with one another as well as with the veneer is effected simultaneously by the use of pressure directed perpendicularly to the plate In this manner all work with gluing, pressing and planing of the plate before the application of the veneer is done away with and the manufacture becomes in this manner so simplified that the manufacture of cross-veneered plates in great quantities is rendered possible. The edges of the boards may advantageously be formed in such manner that they abut against and catch in one another with surfaces inclined to the plane of the plate in such manner that the employed pressure perpendicular to the plate produces a drawing together of the boards. In this manner the joints are very securely pressed together, and the advantage is also obtained that some material is saved at each joint owing to less material having to be trimmed off in view of the fact that an untrimmed board has as a rule more or less inclined edges.

Finally, the invention also comprises cross-veneered wooden plates made according to the present method.

The invention is illustrated in the accompanying drawing which shows a few examples of cross-veneered wooden plates manufactured according to the present method. Fig. 1 shows a top plan view of a wooden plate, the upper veneer being only partly applied. Fig. 2 shows a cross section of the plate, and Fig. 3 is a perspective view of the same. Figs. 4 to 7 inclusive show variations of the shape of the edges of the boards.

The plate shown in Figs. 1–3 is composed of a number of boards 1 the edges of which abut against and catch in one another with surfaces inclined to the plane of the plate in the manner above referred to. Each inclined edge is provided with an angular rib or tongue 2, see Figs. 2 and 3, which catches in a groove of corresponding shape in the edge of the adjacent board, so that when the joint is subjected to pressure directed perpendicularly to the plate said pressure tends to produce a drawing together of the boards. As shown in Fig. 1, the edges of the boards are not quite parallel but each board tapers slightly towards one end as is the case with an untrimmed board. In this manner an additional saving of material will be effected. The boards are preferably joined in such manner that their small ends are alternately directed towards the one and the other side, see Fig. 1. The boards should of course be well dried and made straight and have exactly equal thickness, so that a plate having even surfaces on both sides will be obtained when the edges are caused to engage one another.

When the boards 1 have been coated with glue on both sides as well as on the edges they are assembled on a bottom veneer 3 and another veneer 4 is placed on top, and the whole is pressed together by means of pressure directed perpendicularly to the surface of the plate. The gluing together of the boards and the veneer is thus effected at one time and by means of a single pressing, owing to which time as well as work are saved.

Figs. 4 to 7 inclusive show a few other embodiments of the edges of the boards. According to Fig. 4 no surfaces inclined to the plane of the plate are used, and the pressure directed perpendicularly to the plate can thus of course not effect a drawing together of the boards. Owing to the shape of the edges having surfaces 5 parallel to the plane of the plate, however, an efficient cohesion is still obtained. The constructions shown in Figs. 5–7 are merely slight variations of the construction shown in Figs. 2 and 3 and have the same advantages as the latter. It is a common feature of all these constructions that the edges catch in one another with projecting ribs, tongues or the like, so that an efficient cohesion is obtained, without it being necessary to press together the plate from its edges.

I claim:

1. The method of making cross-veneered wooden plates which consists in shaping the longitudinal edges of boards in such manner that they become capable of catching in one another and of being glued together by means of pressure directed perpendicularly to the plane of the boards, gluing said boards and placing the same together to form a plate, applying a veneer at least to one side of said plate in such manner that the fibres of the veneer cross the fibres of the boards, and securing said boards and said veneer to one another by means of pressure directed perpendicularly to said plate.

2. The method of making cross-veneered wooden plates which consists in shaping the longitudinal edges of boards with surfaces inclined to the plane of the board in such manner that they become capable of catching in one another and of being glued together by means of pressure directed perpendicularly to the plane of the boards, gluing said boards and placing the same together to form a plate, applying a veneer at least to one side of said plate in such manner that the fibres of the veneer cross the fibres of the boards, and securing said boards and said veneer to one another by means of pressure directed perpendicularly to said plate, the edges of the boards being shaped in such manner that said pressure effects a drawing together of the boards.

3. A cross-veneered wooden plate consisting of boards having their longitudinal edges shaped in such manner that they become capable of catching in one another and of being glued together by means of pressure directed perpendicularly to the plane of the boards, said boards being placed together to form a plate, and a veneer applied at least to one side of said plate in such manner that the fibres of the veneer cross the fibres of the boards, said boards being glued and secured to one another and to said veneer by means of pressure directed perpendicularly to said plate.

4. A cross-veneered wooden plate consisting of boards having their longitudinal edges shaped with surfaces inclined to the plane of the board in such manner that they are capable of catching in one another and will be drawn and glued together by a pressure directed perpendicularly to the plane of the boards when joined together, said boards being joined together to form a plate, and a veneer applied at least to one side of said plate in such manner that the fibres of the veneer cross the fibres of the boards, said boards being glued and secured to one another and to said veneer by means of pressure directed perpendicularly to said plate.

ERIK JOHANSSON.